US012746647B2

(12) United States Patent
Tsai

(10) Patent No.: US 12,746,647 B2
(45) Date of Patent: Sep. 29, 2026

(54) BICYCLE TOOL MOUNTED IN BICYCLE TUBE

(71) Applicant: U-POWER COLLECTION ENTERPRISE CO., LTD., Taichung City (TW)

(72) Inventor: Perry Tsai, Taichung City (TW)

(73) Assignee: U-POWER COLLECTION ENTERPRISE CO., LTD., Taichung City (TW)

( * ) Notice: Subject to any disclaimer, the term of this patent is extended or adjusted under 35 U.S.C. 154(b) by 484 days.

(21) Appl. No.: 18/351,325

(22) Filed: Jul. 12, 2023

(65) Prior Publication Data

US 2024/0033886 A1 Feb. 1, 2024

(30) Foreign Application Priority Data

Jul. 29, 2022 (TW) ................................. 111128671

(51) Int. Cl.

| | |
|---|---|
| ***B25B 27/00*** | (2006.01) |
| ***B21L 21/00*** | (2006.01) |
| ***B25B 13/48*** | (2006.01) |
| ***B25F 1/04*** | (2006.01) |
| ***B29C 73/08*** | (2006.01) |
| ***B62J 11/22*** | (2020.01) |

(52) U.S. Cl.

CPC .......... *B25B 27/0071* (2013.01); *B21L 21/00* (2013.01); *B25B 13/48* (2013.01); *B25F 1/04* (2013.01); *B29C 73/08* (2013.01); *B62J 11/22* (2020.02)

(58) Field of Classification Search

CPC ....... B25B 27/0071; B25B 13/48; B25F 1/04; B62J 11/22; B21L 21/00; B29C 73/08

See application file for complete search history.

(56) References Cited

U.S. PATENT DOCUMENTS 6,112,351 A * 9/2000 Hawkins ............. B25B 27/0071 81/437
6,916,106 B2 * 7/2005 Xingguo ................ B25G 1/043 362/120
9,003,927 B2 * 4/2015 Stansbury ............... B29C 73/08 156/97

(Continued)

FOREIGN PATENT DOCUMENTS

DE 102021133086 A1 * 6/2023 ................ B25F 1/02

*Primary Examiner* — David B. Thomas
(74) *Attorney, Agent, or Firm* — MUNCY, GEISSLER, OLDS & LOWE, P.C.

(57) ABSTRACT

A bicycle tool mounted in a bicycle tube comprises a storage tube with an accommodating space, a ring protrusion protrudes radially outward from an outer end of the storage tube, an outer side of the storage tube is annularly provided with a tightening ring at a position close to the ring protrusion; and a repairing component having a base, one side of the base is provided with a tire sealer and another side thereof is fixed with a chain remover, when the repairing component is mounted on the storage tube, the chain remover is located on the outer side of the storage tube, when the bicycle tool is not in use, the bicycle tool can be accommodated in the tube of the bicycle, when the bicycle tool needs to be used, it can be directly pulled out and used without further adjustment to improve the convenience of use.

15 Claims, 6 Drawing Sheets

(56) References Cited

U.S. PATENT DOCUMENTS

| | | | | |
|---|---|---|---|---|
| 9,056,373 | B2 * | 6/2015 | Chen | B25B 27/22 |
| 10,702,982 | B2 * | 7/2020 | Tsai | B26B 11/001 |
| 11,554,475 | B2 * | 1/2023 | Bacon | B62K 21/12 |
| 11,833,654 | B2 * | 12/2023 | Pfeiffer | B25B 27/0071 |
| 2009/0194439 | A1 * | 8/2009 | Gross | B25B 27/0071<br>81/487 |
| 2014/0298956 | A1 * | 10/2014 | Kerner | B29C 73/06<br>81/15.7 |
| 2021/0187713 | A1 * | 6/2021 | Winefordner | B25F 1/04 |
| 2021/0197348 | A1 * | 7/2021 | Bacon | B25B 27/22 |
| 2021/0197353 | A1 * | 7/2021 | Pfeiffer | B62K 21/26 |
| 2021/0197920 | A1 * | 7/2021 | Bacon | B25F 1/02 |

* cited by examiner

BICYCLE TOOL MOUNTED IN BICYCLE TUBE

FIELD OF THE INVENTION

The invention is related to a bicycle tool, and more particularly to a bicycle tool mounted in a bicycle tube that can be stored in the bicycle tube and can be taken out for using directly.

DESCRIPTION OF THE RELATED ART

When riding a bicycle, light weight and simple and convenient to use are usually emphasized, so users will not carry too much equipment during the riding process. But in the process of riding a bicycle, users will encounter bicycle damage that needs to be repaired on the spot; there is a common bicycle tool that can be stored in a cylindrical shape and can be conveniently placed in the tube of a bicycle. When not in use, the bicycle tool can be accommodated in the tube of the bicycle; when repair is required, the bicycle tool is taken out from the tube, and the appropriate hand tool is turned out for use.

The commonly used bicycle tool is stored in a cylindrical configuration, and a plurality of hand tools are hidden inside. When the bicycle tool needs to be used, the bicycle tool is taken out from the tube of the bicycle, take out the hand tools from the bicycle tool, and then pull out the appropriate hand tool to be used. The whole process takes a lot of time to find or take out the hand tool, which is very inconvenient and wasting time.

SUMMARY OF THE INVENTION

An object of the invention is to provide a bicycle tool which can be stored in a tube of a bicycle, and can be used directly after being taken out.

A bicycle tool mounted in a bicycle tube provided by the invention comprises:

a storage tube provided with an accommodating space, a ring protrusion protrudes radially outward from an outer end of the storage tube, an outer side of the storage tube is annularly provided with a tightening ring at a position close to the ring protrusion; and a repairing component having a base, one side of the base is provided with a mounting part, the mounting part can be optionally disposed in the accommodating space of the storage tube, a tire sealer is disposed on an end surface of the mounting part; a chain remover is fixed on an end surface of the base without the mounting part, when the mounting part is assembled in the storage tube, the chain remover is located at a front end of the storage tube.

In the bicycle tool mounted in the bicycle tube provided by the invention, the chain remover of the repairing component is directly exposed at one end of the bicycle tool. When the bicycle tool is not in use, the bicycle tool can be stored in the bicycle tube; when the bicycle tool needs to be used, hand tools at one end of the bicycle tool can be used immediately after taking out the bicycle tool from the bicycle tube, so that preparation time before using an appropriate hand tool can be reduced.

BRIEF DESCRIPTION OF DRAWINGS

In order to further understand the objects, features, and achieved efficacies of the invention, one preferred embodiment is described below for detailed explanation in conjunction with the drawings, in which.

DETAILED DESCRIPTION OF THE INVENTION

Figure 1:
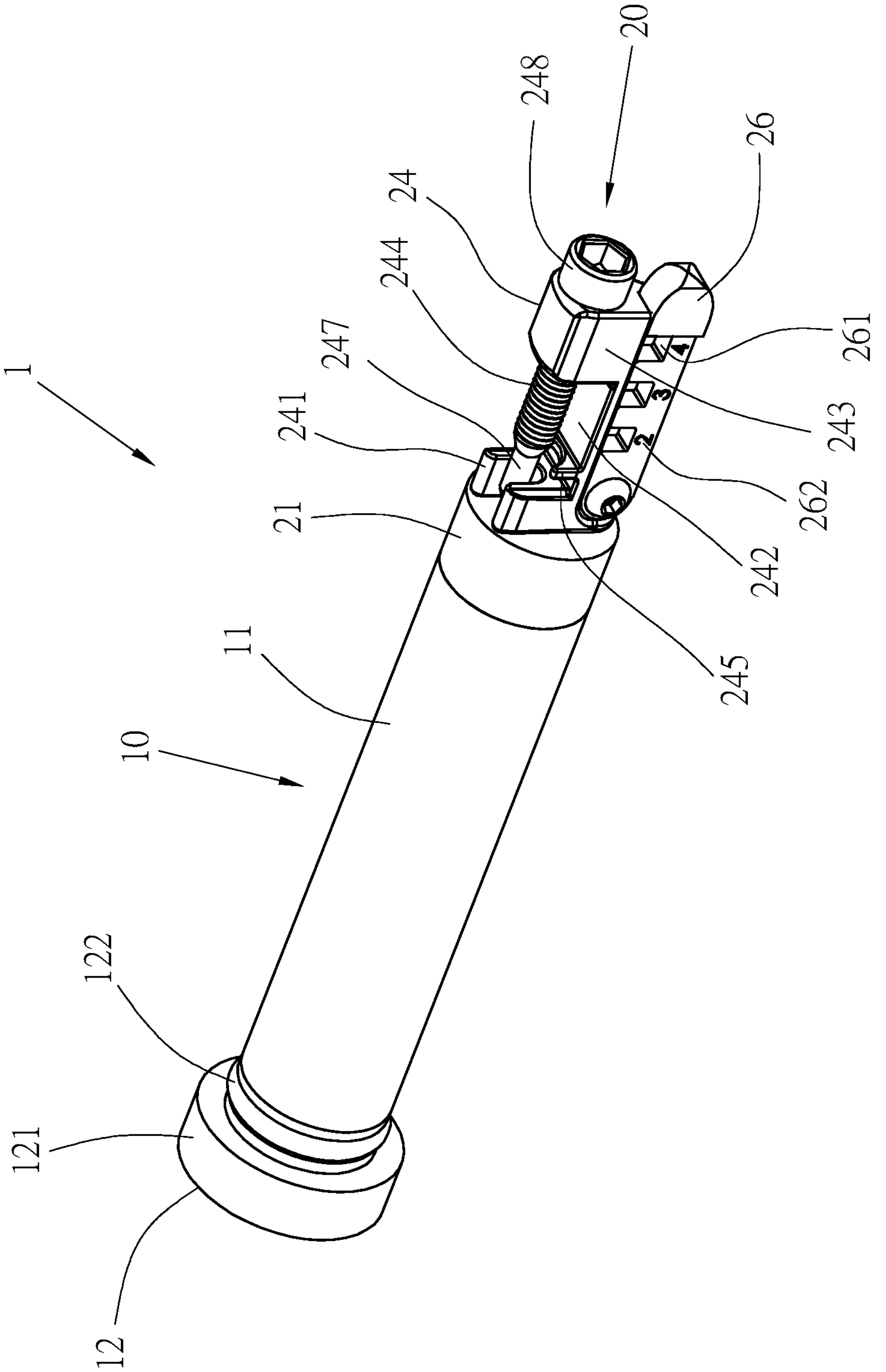
FIG. 1 is a perspective view of a preferred embodiment of the invention.
Figure 2:
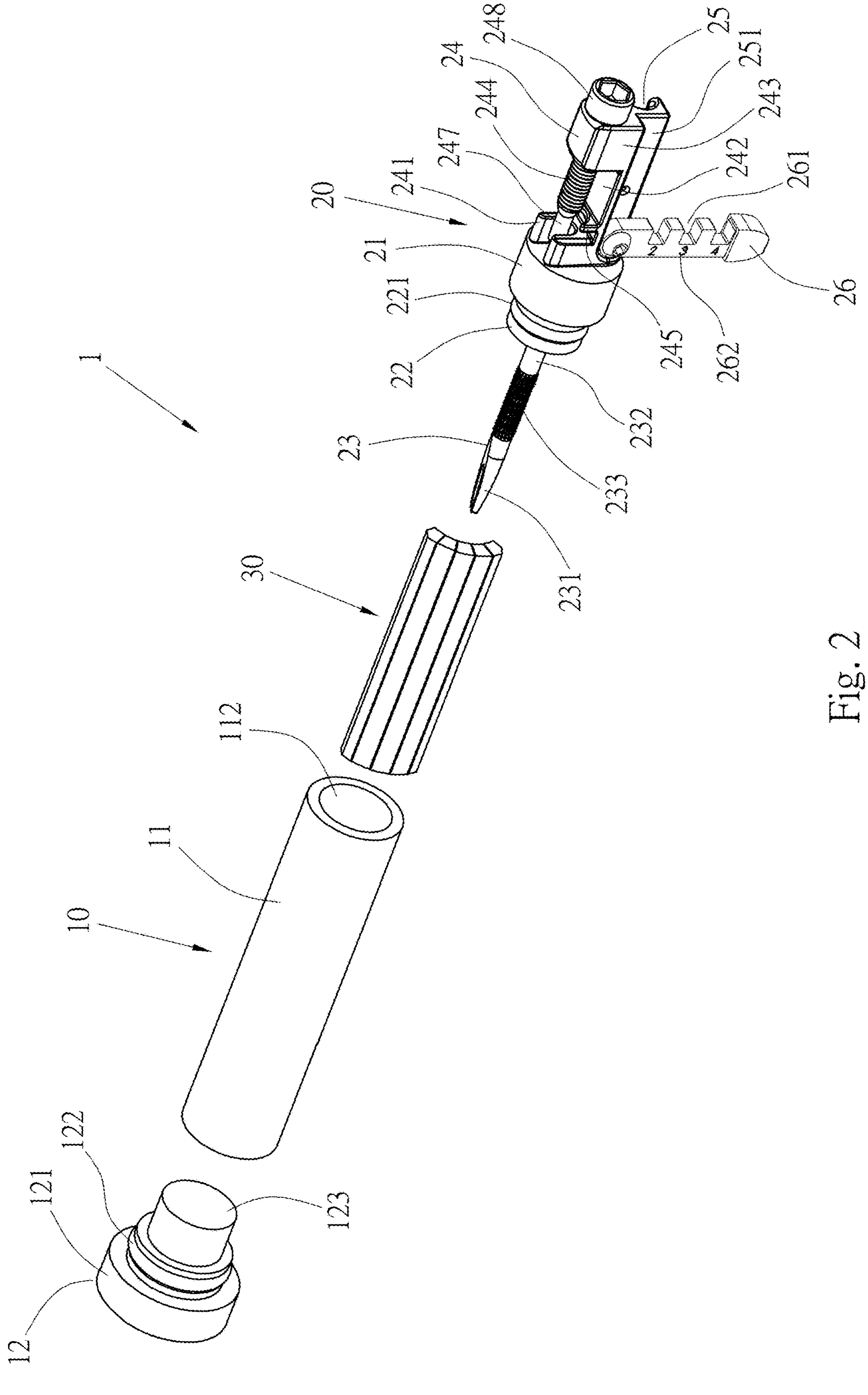
FIG. 2 is an exploded perspective view of a preferred embodiment of the invention.
Figure 3:
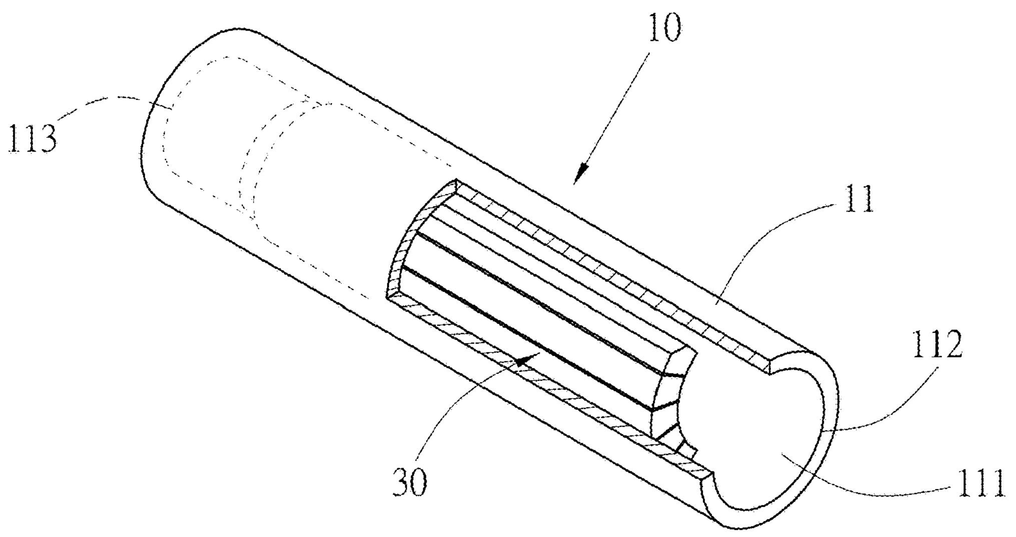
FIG. 3 is a partial sectional view of a storage tube of a preferred embodiment of the invention.

Please refer to FIG. 1 to FIG. 4, the invention provides a bicycle tool 1, which is inserted and accommodated in a tube T of a bicycle when not in use. This embodiment shows that the bicycle tool 1 is disposed in the tube T of a handlebar of the bicycle and is taken out from the tube T when the bicycle tool 1 is to be used. The bicycle tool 1 comprises a storage tube 10 and a repairing component 20.

The storage tube 10 comprises a tube 11 and an end cap 12. The tube 11 is provided with an accommodating space 111 in an axial direction, an inner end of the tube 11 is provided with a first opening 112 and an outer end of the tube 11 is provided with a second opening 113, the first opening 112 and the second opening 113 are communicated with the accommodating space 111. An outer end of the end cap 12 radially outwardly protrudes a ring protrusion 121, the end cap 12 is annularly provided with a soft tightening ring 122 at a position close to the ring protrusion 121, and an assembling block 123 is disposed on the end cap 12, the tightening ring 122 is disposed between the ring protrusion 121 and the assembling block 123. The assembling block 123 is disposed in the accommodating space 111 of the tube 11 from the second opening 113, and can be fixed by tight fitting, glue or screw. When the storage tube 10 is placed into the tube T of the bicycle, the tightening ring 122 can be elastically tightened on an inner tube wall of the tube T to be positioned. In addition, a diameter of the ring protrusion 121 is larger than a diameter of the tube T. When the storage tube 10 is placed into the tube T, the ring protrusion 121 will be exposed on an outer side of the tube T of the bicycle to facilitate a user to take the bicycle tool 1 out from the tube T. In terms of production, the storage tube 10 can also be integrally formed, that is, the tube 11 and the end cap 12 are integrally formed into a single-piece structure.

The repairing component 20 has a base 21, one side of the base 21 is provided with a mounting part 22, a diameter of the mounting part 22 is slightly smaller than that of the base 21, and an outer peripheral surface of the mounting part 22 is provided with an installation tightening ring 221. The mounting part 22 can be optionally disposed in the accommodating space 111 of the tube 11 from the first opening 112, and forms an elastic tight positioning through the installation tightening ring 221, and can also be removed by applying force.

An end surface of the mounting part 22 is provided with a tire sealer 23, the tire sealer 23 comprises a fork 231 and a shaft 232. Two ends of the shaft 232 are respectively connected with the fork 231 and the mounting part 22, a peripheral surface of the shaft 232 is provided with a grinding part 233.

A chain remover 24 and a tooth portion 25 are fixed on an end surface of the base 21 without the mounting part 22, an auxiliary tool 26 is pivotally disposed on the tooth portion 25.

The chain remover 24 comprises a pin withdrawal groove 241, an assembly groove 242, a screw seat 243 and a screw element 244. The pin withdrawal groove 241 is fixed on an end surface of the base 21. The assembly groove 242 is disposed on the pin withdrawal groove 241, a positioning block 245 is disposed on the assembly groove 242. The screw seat 243 is disposed on the assembly groove 242. The screw element 244 is screwed on the screw seat 243 and capable of moving reciprocatingly in the assembly groove 242, a front end of the screw element 244 located in the assembly groove 242 is provided with a push pin 247, and an opposite rear end of the screw element 244 is provided with an insertion groove 248. The insertion groove 248 is hexagonal for inserting a hex wrench or other connectors to increase a turning moment arm.

The tooth portion 25 is provided with a semicircular open jaw 251 at a top thereof. The auxiliary tool 26 is pivotally disposed on a bottom of the tooth portion 25.

In this embodiment, the auxiliary tool 26 is provided with at least two spoke adjustment grooves 261, for example, three spoke adjustment grooves 261. The spoke adjustment grooves 261 have different sizes, and can be changed according to different requirements, such as screwdrivers, wrenches, or other bicycle-related hand tools. The auxiliary tool 26 is provided with three marks 262 thereon, the marks 262 show sizes of the spoke adjustment grooves 261 for the user to choose a size easily. The chain remover 24, the tooth portion 25 and the auxiliary tool 26 are disposed on a top end of the base 21, when the repairing component 20 is assembled on the storage tube 10, the repairing component 20 will be located at a front end of the storage tube 10, that is, an outer side of the storage tube 10.

A plurality of elongated tire patching strips 30 used for patching tire are disposed in the accommodating space 111 of the storage tube 10.

Figure 4:
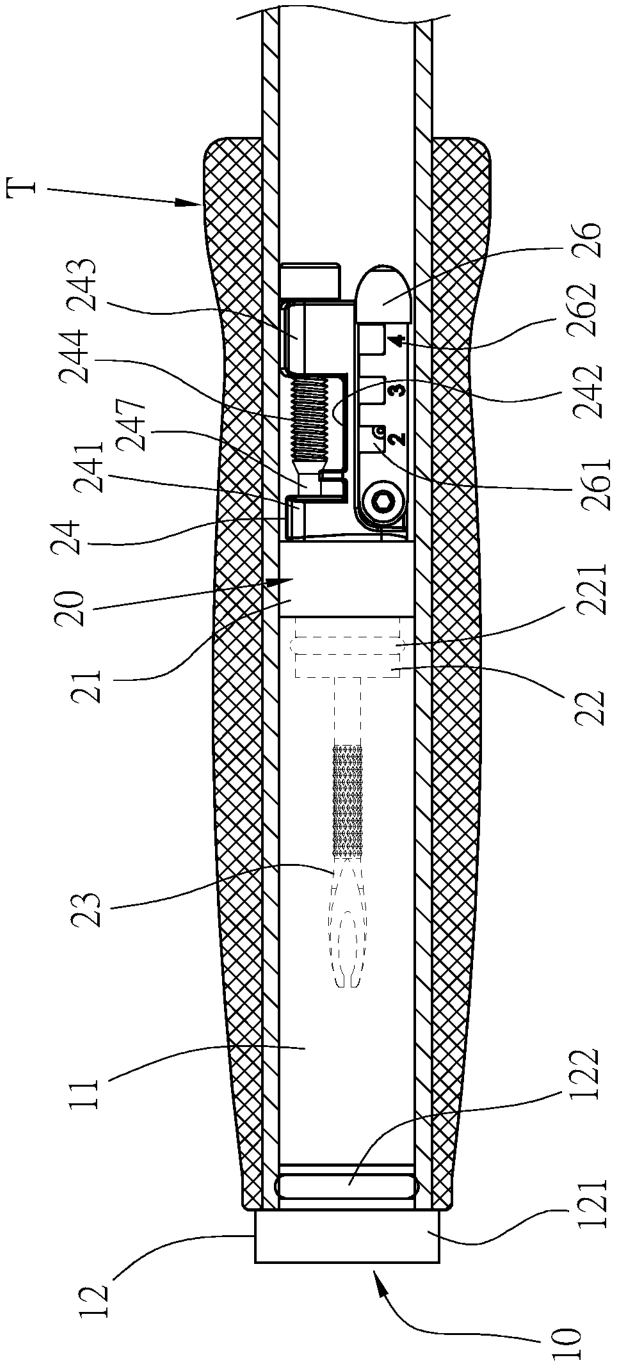
FIG. 4 is a schematic diagram of a bicycle tool mounted in a bicycle tube according to a preferred embodiment of the invention.

Please refer to FIG. 4, when the bicycle tool 1 is not in use, the bicycle tool 1 can be stored (accommodated) inside the tube T of the bicycle, and the tightening ring 122 can be elastically tightened against an inner wall of the tube T, so that the bicycle tool 1 can be fixed will not fall off. The tube T can be a tube of a handlebar, a stem, a seat tube or a pedal of the bicycle. The repairing component 20 is elastically tightened and fixed on an inner wall of the accommodating space 111 of the storage tube 10 by the installation tightening ring 221 of the mounting part 22, as shown in FIG. 4, so that the tire sealer 23 is located in the accommodating space 111, and the chain remover 24, the tooth portion 25 and the auxiliary tool 26 are located on an outer side of the repairing component 20, and are disposed inside the tube T together. When the repairing component 20 needs to be used, the user can hold the ring protrusion 121, after applying force to pull the ring protrusion 121, the bicycle tool 1 can be taken out from the tube T of the bicycle. Since the chain remover 24, the tooth portion 25 and the auxiliary tool 26 of the repairing component 20 are located at the front end of the storage tube 10 and exposed at one end of the bicycle tool 1, as shown in FIG. 1, after taking out the bicycle tool 1 from the tube T, the various hand tools 24, 25, 26 located at one end of the bicycle tool 1 can be directly used by the user. The hand tools 24, 25, 26 are not hidden in the bicycle tool 1 and can be directly used by the user, which is more convenient and time-saving than the prior art.

Figure 5:
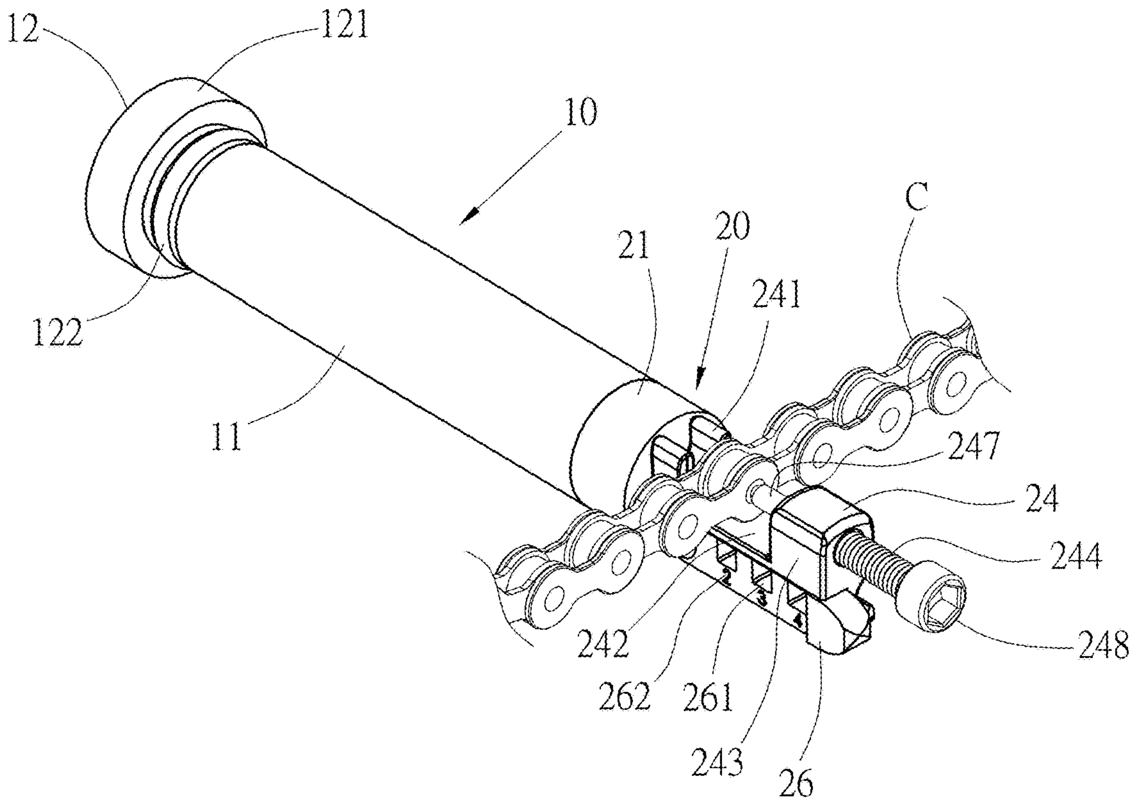
FIG. 5 is a perspective view of using the bicycle tool to dismount a chain according to a preferred embodiment of the invention.
Figure 6:
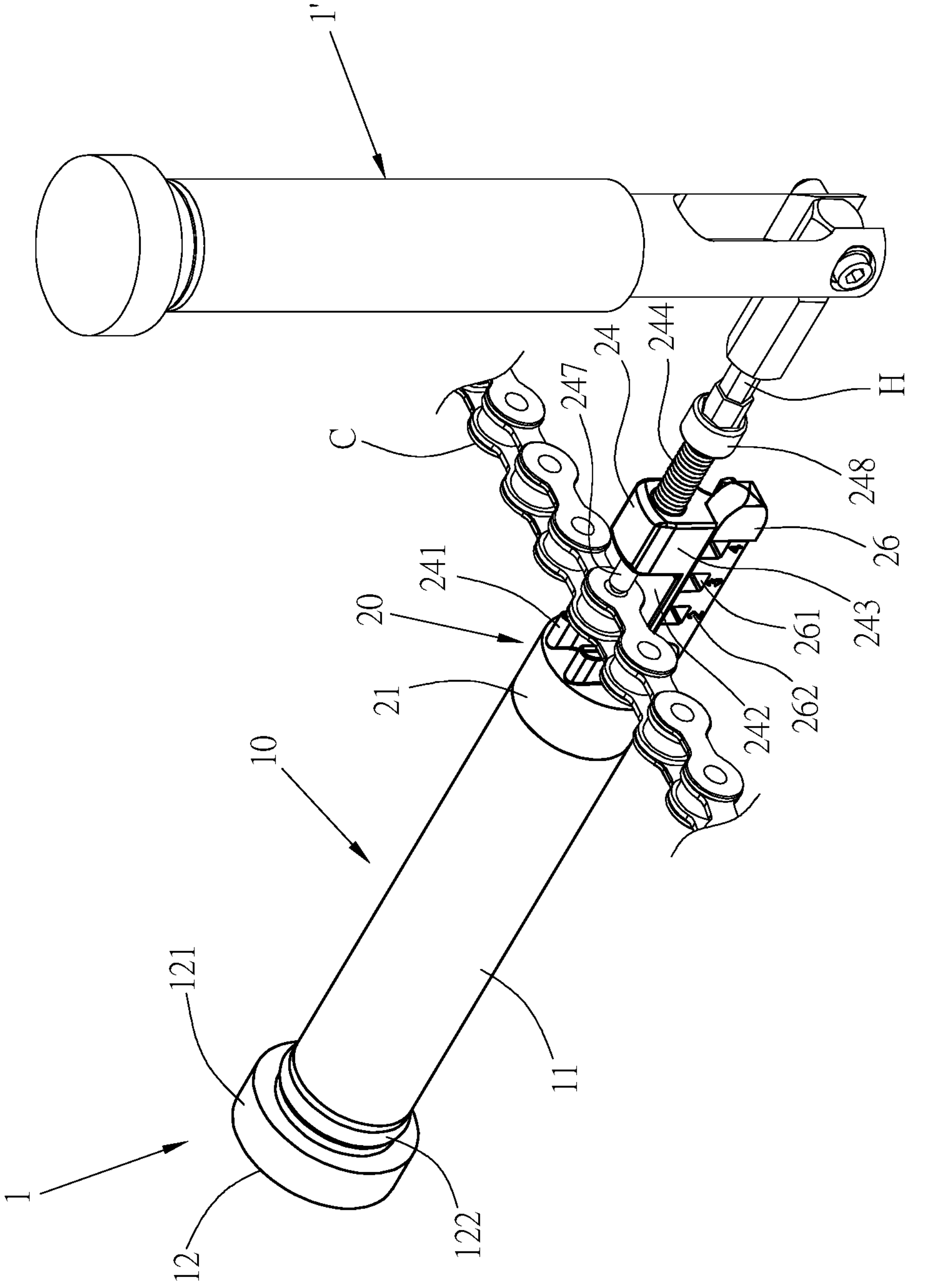
FIG. 6 is a perspective view of using the bicycle tool to cooperate with another bicycle tool to dismount a chain according to a preferred embodiment of the invention.

Please refer to FIG. 5, when a chain C is to be disassembled, the screw element 244 is first screwed in a direction away from the pin withdrawal groove 241, so that the chain C can be placed in the assembly groove 242, and a position of the chain C is fixed by limitation of the positioning block 245. Then the screw element 244 is rotated to move towards the pin withdrawal groove 241, so that the push pin 247 can perform an action of withdrawing pin, and an action of repairing the chain C can be carried out. Please refer to FIG. 6, if a rotational force of the user is not large enough, a connecting rod H can be connected on the insertion groove 248 to increase the rotational force. In this embodiment, the connecting rod H is disposed on another bicycle tool 1' in the tube T of the bicycle, the bicycle tool 1' can also be stored in another tube of the bicycle when not in use, and can be taken out for using with the bicycle tool 1.

Figure 7:
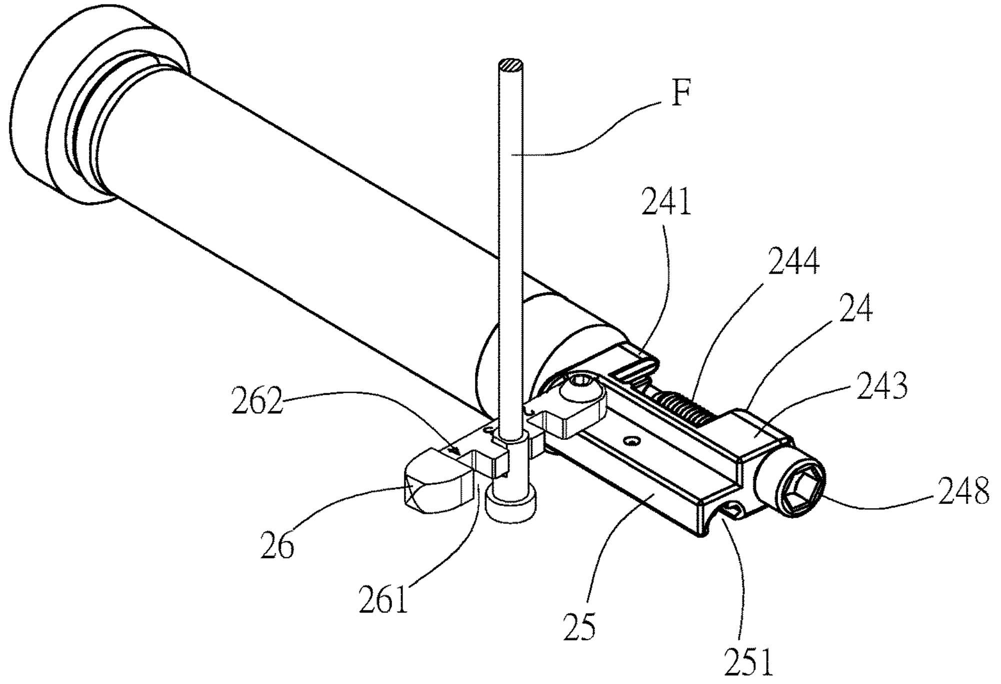
FIG. 7 is a perspective view of using the bicycle tool for a spoke according to a preferred embodiment of the invention.

Please refer to FIG. 7, when a tightness of a spoke F needs to be adjusted, the auxiliary tool 26 can be rotated to expose the spoke adjustment grooves 261 on the auxiliary tool 26, the user can select the spoke adjustment groove 261 of a corresponding size according to the marks 262, and snap the spoke adjustment groove 261 on the spoke F to rotate and adjust, and then fold the auxiliary tool 26 away after use. In addition, the jaw 251 on the tooth portion 25 in this embodiment is used for adjusting special spokes. Furthermore, a position where the jaw 251 is disposed can also be made into a sleeve structure used for rotating bolts or nuts.

Figure 8:
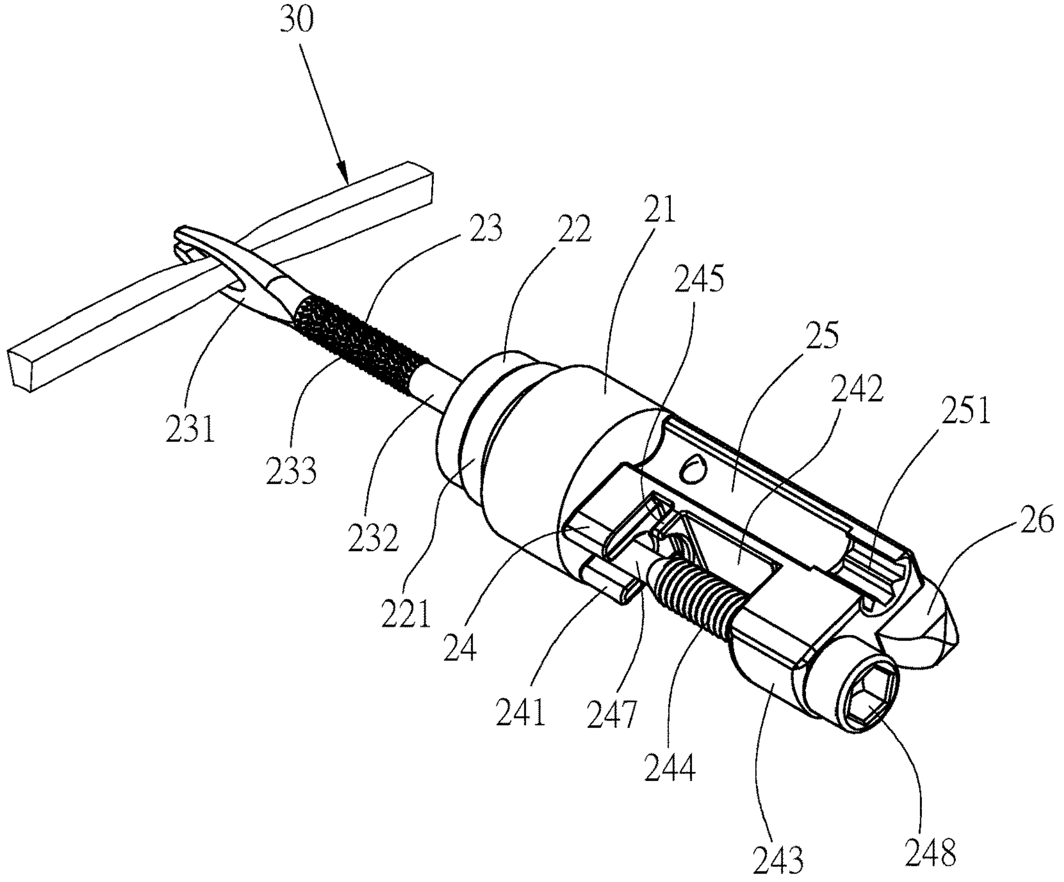
FIG. 8 is a perspective view of using the bicycle tool for patching a tire according to a preferred embodiment of the invention.

Please refer to FIG. 8, when the tire sealer 23 needs to be used, the repairing component 20 can be taken out from the storage tube 10 first, so that the tire sealer 23 can be taken out from the accommodating space 111. The tire patching strips 30 in the accommodating space 111 are taken out together, one of the tire patching strips 30 can be disposed in the fork 231 of the tire sealer 23, and tire patching can be carried out by holding the base 21 with hand. In addition, the grinding part 233 on the shaft 232 of the tire sealer 23 can assist the user to perform simple grinding operation. When a torn part of a tire is too small for inserting the tire patching strip 30 smoothly, the shaft 232 can be inserted into the tire, and the grinding part 233 can be used to enlarge the torn part of the tire, so that the tire patching strip 30 can be inserted smoothly.

The bicycle tool 1 provided by the invention can be accommodated in the tube T of a frame of the bicycle, and the hand tools 24, 25, 26 at one end of the bicycle tool 1 can be used directly after being taken out. Compared with the conventional bicycle tools, the hand tools still need to be taken out from the bicycle tool before the hand tools can be used, the bicycle tool 1 of the invention is more convenient to use.

Although the invention has been disclosed as above with the embodiment, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. A bicycle tool mounted in a bicycle tube comprising:

a storage tube provided with an accommodating space, a ring protrusion protruding radially outward from an outer end of the storage tube, the outer end of the storage tube being annularly provided with a tightening ring at a position close to the ring protrusion; an inner end of the storage tube being an open end with a first opening communicating with the accommodating space; and a repairing component having a base, one side of the base being provided with a mounting part, the mounting part being detachably disposed in the first opening of the storage tube, a tire sealer being disposed on an end surface of the mounting part;

a chain remover being disposed on another side of the base;

wherein, when the mounting part of the repairing component being disposed in the first opening of the inner end of the storage tube, the chain remover being located outside the storage tube and the tire sealer being located in the accommodating space.

2. The bicycle tool as claimed in claim 1, wherein the storage tube comprises a tube and an end cap; the tube has the accommodating space, the first opening is disposed at an inner end of the tube; an outer end of the tube is provided with a second opening communicating with the accommodating space; one end of the end cap is provided with the ring protrusion, another end of the end cap is provided with an assembling block, and the assembling block of the end cap is assembled in the second opening of the tube.

3. The bicycle tool as claimed in claim 2, wherein the tightening ring is disposed on the end cap, positioned between the ring protrusion and the assembling block.

4. The bicycle tool as claimed in claim 2, wherein the assembling block of the end cap is detachably assembled in the second opening of the tube.

5. The bicycle tool as claimed in claim 1, wherein the tire sealer comprises a fork and a shaft; two ends of the shaft are connected to the fork and the mounting part respectively, and an outer peripheral surface of the shaft of the tire sealer is provided with a grinding part.

6. The bicycle tool as claimed in claim 1, wherein an outer peripheral surface of the mounting part is provided with an installation tightening ring.

7. The bicycle tool as claimed in claim 1, wherein at least one tire patching strip is disposed in the accommodating space.

8. The bicycle tool as claimed in claim 1, wherein the chain remover comprises a pin withdrawal groove, an assembly groove, a screw seat and a screw element; the pin withdrawal groove is fixed on an end surface of the base; the assembly groove is disposed on the pin withdrawal groove, a positioning block is disposed on the assembly groove; the screw seat is disposed on the assembly groove; the screw element is screwed on the screw seat and capable of moving reciprocatingly in the assembly groove, and a front end of the screw element is provided with a push pin.

9. The bicycle tool as claimed in claim 1, wherein further comprising a tooth portion disposed by the side of the chain remover, and one end of the tooth portion having a generally semicircular open jaw.

10. The bicycle tool as claimed in claim 9, wherein the repairing component further comprises an auxiliary tool pivotally disposed on the base.

11. The bicycle tool as claimed in claim 10, wherein the auxiliary tool is provided with at least one spoke adjustment groove.

12. The bicycle tool as claimed in claim 11, wherein two or more than two of the spoke adjustment grooves are provided, sizes of the spoke adjustment grooves are different, and the auxiliary tool is provided with marks on sides of the spoke adjustment grooves respectively.

13. The bicycle tool as claimed in claim 1, wherein the repairing component further comprises an auxiliary tool pivotally disposed on the base.

14. The bicycle tool as claimed in claim 13, wherein the auxiliary tool is provided with at least one spoke adjustment groove.

15. The bicycle tool as claimed in claim 14, wherein two or more than two of the spoke adjustment grooves are provided, sizes of the spoke adjustment grooves are different, and the auxiliary tool is provided with marks on sides of the spoke adjustment grooves respectively.

* * * * *